(12) United States Patent
McGill et al.

(10) Patent No.: US 7,476,018 B2
(45) Date of Patent: Jan. 13, 2009

(54) BLENDING APPARATUS

(75) Inventors: Shane Robert McGill, Kent (GB);
Martin White, Kent (GB)

(73) Assignee: McGill Technology Limited, Kent (GB)

( * ) Notice: Subject to any disclaimer, the term of this patent is extended or adjusted under 35 U.S.C. 154(b) by 757 days.

(21) Appl. No.: 10/519,365

(22) PCT Filed: Jun. 27, 2003

(86) PCT No.: PCT/GB03/02799

§ 371 (c)(1),
(2), (4) Date: Dec. 28, 2004

(87) PCT Pub. No.: WO2004/002281

PCT Pub. Date: Jan. 8, 2004

(65) Prior Publication Data

US 2006/0039235 A1    Feb. 23, 2006

(30) Foreign Application Priority Data

Jun. 28, 2002  (GB) ................................ 0215077.9

(51) Int. Cl.
*B01F 7/00*       (2006.01)
*B01F 15/00*     (2006.01)
(52) U.S. Cl. ....................... 366/197; 366/204; 366/205; 366/207
(58) Field of Classification Search ................. 366/197, 366/204, 205, 207
See application file for complete search history.

(56) References Cited

U.S. PATENT DOCUMENTS

| | | | |
|---|---|---|---|
| 2,246,054 A | 6/1941 | Marty | |
| 2,793,667 A | 5/1957 | Sigfrid | |
| 4,135,828 A * | 1/1979 | Cabak | 366/197 |
| 5,865,538 A * | 2/1999 | Walker et al. | 366/197 |
| 6,241,380 B1 * | 6/2001 | Bornemann et al. | 366/217 |
| 6,331,070 B1 * | 12/2001 | Desai | 366/197 |
| 6,338,569 B1 * | 1/2002 | McGill | 366/144 |

(Continued)

FOREIGN PATENT DOCUMENTS

EP    1 517 632    9/2006

(Continued)

OTHER PUBLICATIONS

EPO, Written opinon of PCT/GB02/02799, 2 pages, dated Sep. 9, 2005.*

(Continued)

*Primary Examiner*—Tony G Soohoo
(74) *Attorney, Agent, or Firm*—Nixon & Vanderhye P.C.

(57) ABSTRACT

This invention is concerned with providing apparatus for blending product within a container (10) by charging the container with product, applying a lid (12) with an integral blending element (14) thereon. The product is blended by driving the blending element with an external drive (34) whilst the container is in an inverted position. The assembled and filled container is located in a holder (22) whilst in a generally upright position and the holder is moved to invert the container so that the lid is lowermost and the product is in contact with the blending element in which position the product is blended. Inversion may take place in a housing (23) in which the product may be heated to a blending temperature.

7 Claims, 12 Drawing Sheets

U.S. PATENT DOCUMENTS

| | | | | |
|---|---|---|---|---|
| 6,802,641 B2 * | 10/2004 | Ladatto et al. | | 366/200 |
| 6,854,875 B2 * | 2/2005 | McGill | | 366/199 |
| 7,066,640 B2 * | 6/2006 | Sands | | 366/205 |
| 7,147,365 B2 * | 12/2006 | McGill | | 366/199 |
| 7,168,845 B2 * | 1/2007 | McGill | | 366/204 |
| 7,309,156 B2 * | 12/2007 | McGill | | 366/199 |
| 2006/0039235 A1 * | 2/2006 | McGill et al. | | 366/279 |

FOREIGN PATENT DOCUMENTS

| | | | |
|---|---|---|---|
| JP | 2000 121060 | | 4/2000 |
| KR | 1996-0007233 | | 8/1996 |
| KR | 263 732 | | 9/2000 |
| WO | WO 99 21 466 A | * | 5/1999 |

OTHER PUBLICATIONS

International Search Report for PCT/GB03/02799, mailed Oct. 23, 2003, 3 pages.

* cited by examiner

BLENDING APPARATUS

This application is the US national phase of international application PCT/GB2003/002799 filed 27 Jun. 2003 which designated the U.S. and claims benefit of GB0215077.9, dated 28 Jun. 2002, the entire content of which is hereby incorporated by reference.

This invention relates to blending apparatus and in particular, but not exclusively, to apparatus for blending food product within a container, to a container for such blending and to a method of operating the blending process.

It has been proposed to blend food product within a container when preparing, for example, milkshakes in which the blending elements are located within the container and are driven to cause the contents to be blended. Such apparatus is described in WO 99/21466.

A primary intention of such apparatus is to enable hygienic and efficient dispensing to take place and the container and associated blending elements may be disposable after use.

An object of the present invention is to provide improved apparatus for blending and dispensing food product.

According to the invention, blending apparatus comprises a container having an opening through which product to be blended is introduced into the container, a lid to close the opening, a blending element mounted on the lid and directed downwards into the container when the lid is located thereon, drive means driveably engageable with the blending element to rotate the element and obtain a blending action on product in the container, mounting means on which an assembly of container, lid and blending element is arranged to be located during blending, the container being moveable between an upright receiving position, and an operative position in which the assembly is inverted with the lid lowermost and the drive means is connectable to the blending element.

The mounting means may include a container holder into which the container is inserted and the holder is rotatable between the receiving position and the operative position. In the operative position the container may be upright and inverted. In the receiving position the container may be generally upright or inclined at an angle to the vertical with the lid directed upwardly.

Clamping means may be provided for holding the container in the holder during movement between the receiving and operative positions. Alternatively, the container is located within a seating, which may be tapered, which holds the container in place during inversion and operation.

The mounting means may be located within a housing with access into the housing through an opening. The drive means may be located in the base of the housing for connection to the blending element when in the inverted operative position. The drive means may be moveable vertically into driving engagement with the blending means after the container reaches an operative blending position.

The housing may also provide a microwave housing whereby product within the container may be heated by microwave radiation prior to, during and/or after a blending operation.

The invention also provides a container assembly for the blending apparatus comprising a nestable container base, a lid to seal an upper opening of the base, and a blending element mounted on the lid for rotation relative thereto and extending into the container when assembled, the lid having an opening for receiving the blending element rotatably therein, the blending element including a shaft towards one end of which is carried blending blades and towards the other end of which is connection means for effecting driving connection with drive means, the shaft extending through the opening in the lid in use, the assembly being inverted in use to blend product in the container in the inverted position by operation of the blending element.

Preferably, the lid is nestable with other lids.

Conveniently, the shaft of the blending element is a force fit into the opening in the lid and the shaft surface provides a bearing surface to permit rotation of the blending element relative to the lid. In practice, the shaft defines a shoulder which is a force fit through the opening and after entering the opening the shoulder prevents disengagement of the blending element.

There is also provided a method of blending product within a container comprising an assembly of container base, lid for sealing an upper opening of the base, and a blending element mounted for rotation relative to the lid, in which the container base is filled through the upper opening, the blending element is united with the lid to be rotatable relative thereto, the lid is placed over the upper opening of the base and is sealed thereto, the assembly containing the food product is located in a holder, the holder is rotated to invert the container so that the lid is directed downwardly, and drive means is drivingly connected to the blending element and operated to blend product within the container.

The container may be sealed after filling by a diaphragm heat sealed over the upper opening giving a sterile seal. Preferably, the diaphragm is located over the lid and associated blending element. The seal is removed before blending or the drive means is forced through the seal.

Usually the product within the container is at a cold temperature when it is located in the holder. If required, the container with cold product is heated after location in the holder, conveniently by microwave means, to a temperature ready for blending.

The product may be filled at ambient cold temperature, or the product filling temperature may be hot for transportation at ambient temperature, or it may be transported chilled or frozen to a blending location. If the product is in a frozen or chilled state at the dispensing location it may be heated prior to a blending operation. Any later cooling of product is to the consumption temperature immediately prior to blending. Alternatively the product may be consumed warm or hot, and heating may be by microwave means.

Further features of the invention will appear from the following description of an embodiment of an invention given by way of example only and with reference to the drawings, in which:

FIGS. 16A, 16B and 16C show a container locking device Referring to the drawings, a container 10, shown in more detail in FIGS. 5-8, comprises a base part 11, which is of tapered shape, narrower at its closed end and having an opening at its other, wider end. The base 11 is therefore nestable with other bases so that a plurality of such bases occupy little space when nested together. The container 10 has a lid 12 which is shaped to be located over the wider end of the base 11 and has a circumferential lip 13 for this purpose which may snap over the end of the container or be heat sealed thereto. Centrally of the lid 12 is formed an opening of circular section arranged to admit a blending element 14 therethrough for rotation relative to the lid 12. Alternatively, the opening may be located off-centre providing a central location for injecting product such as flavouring, carbon dioxide etc. into the container.

Figure 8:
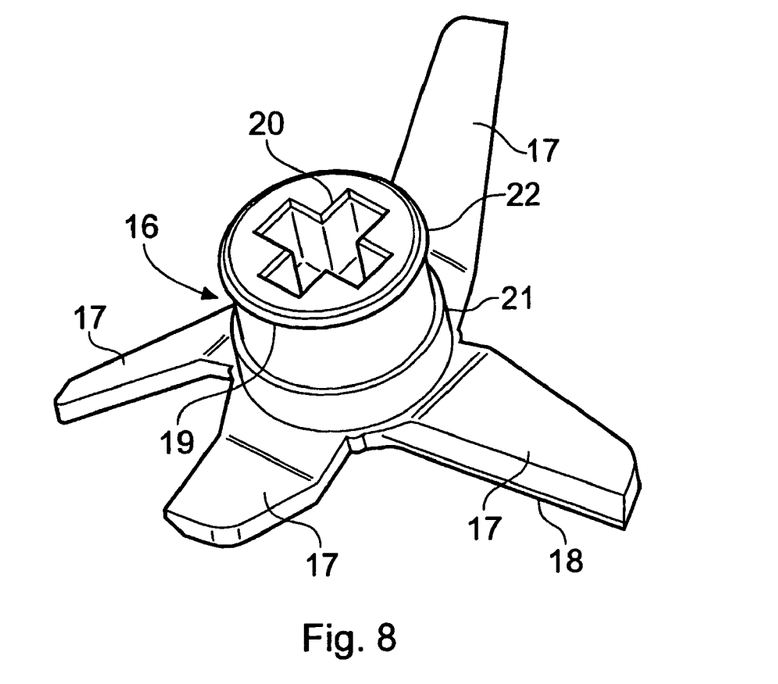
FIG. 8 is a perspective view of the blending element from one side.
Figure 9:
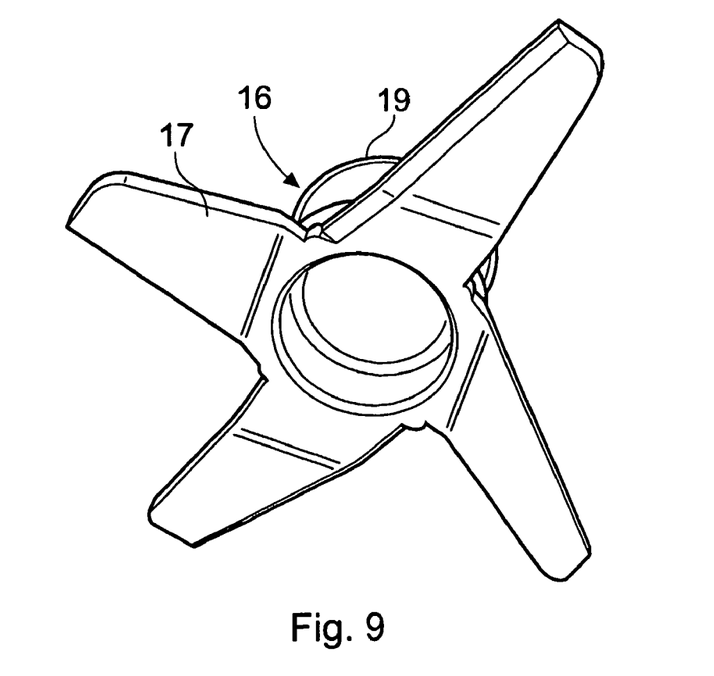
FIG. 9 is a perspective view of the blending element of FIG. 8 from the other side.

The blending element 14 comprises a shaft portion 16 which has opposite ends, on one of which is formed blending blades 17. In the illustrated arrangement such blending blades 17 extending radially outwardly, having leading blending edges 18 and being angled at various angles to give an effective blending action, but other blade arrangements may be used. At the other end of the shaft portion 16 is formed a shoulder 19.

Towards the opposite end of the blending element 16 is formed a shaped opening 20, arranged to receive drive means 34 whereby the blending element is rotatable about its axis.

Figure 5:
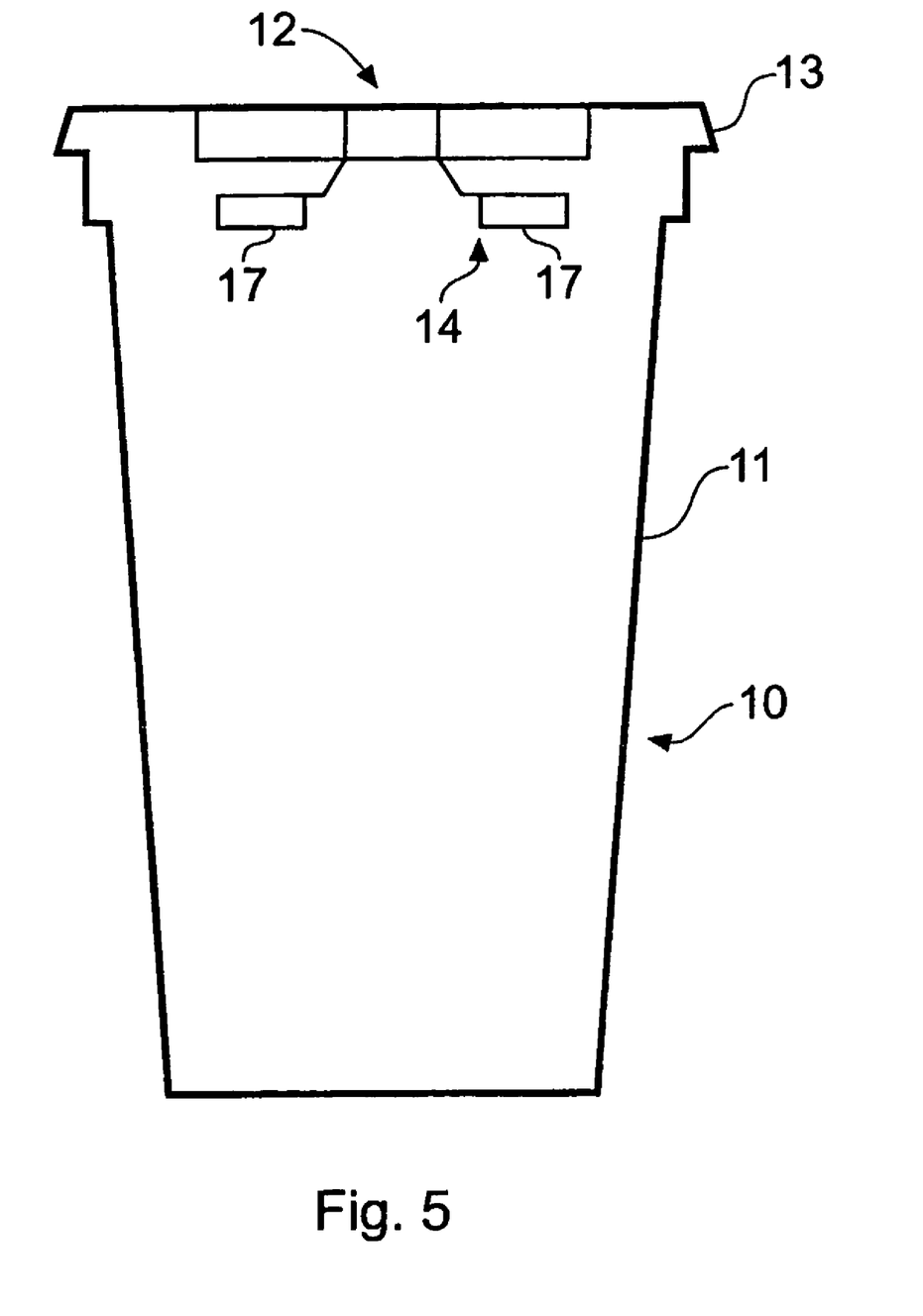
FIG. 5 is a vertical section through a container for use in the apparatus.

The shaft 16 is stepped at 21 and has the shoulder 19 which sealingly engages the walls of the opening in the lid 12 when assembled thereto.

Figure 6:
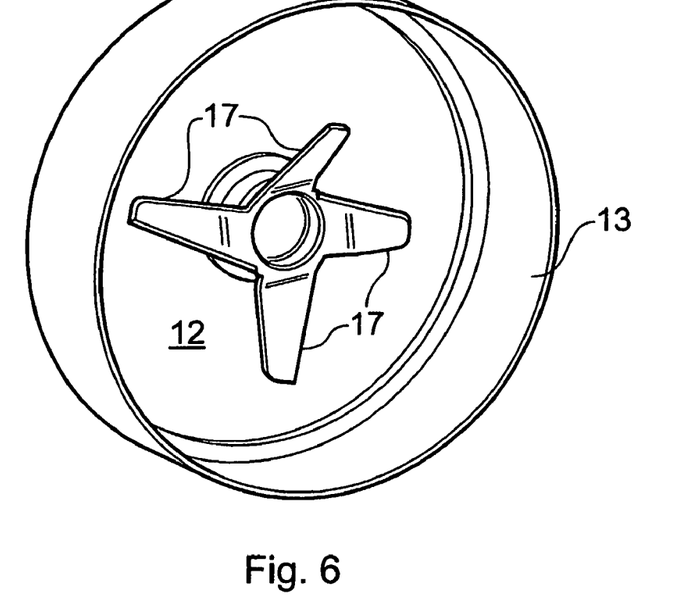
FIG. 6 is a perspective view of an assembled lid and blending element of the container of FIG. 5.
Figure 7:
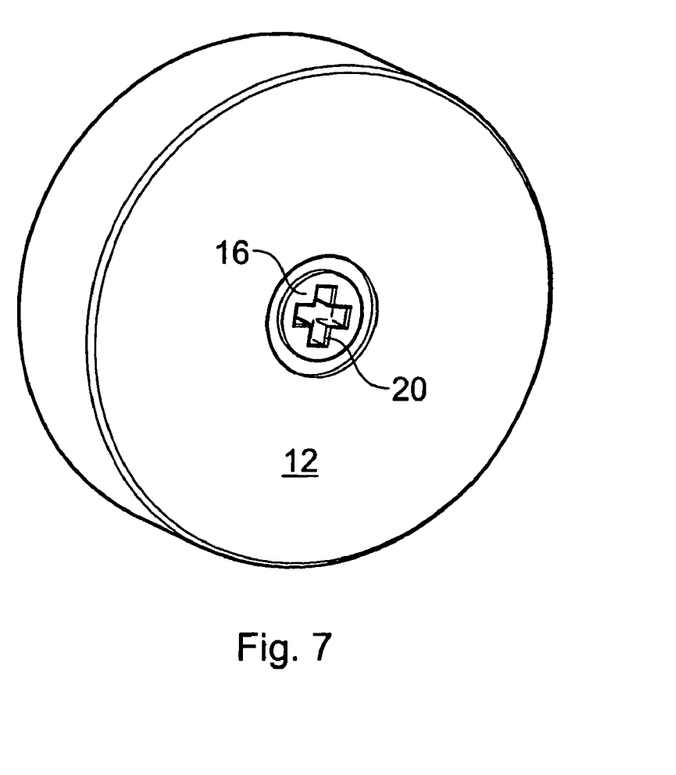
FIG. 7 is a further perspective view corresponding to FIG. 6, but from the opposite side.

Assembly of the blending means 14 to the lid 12 is by inserting the shaft 16 upwardly through the lid opening with the shoulder 19 engaging as a push-fit so that the blending element 14 is rotatably mounted on the lid 12, the surfaces of the shaft portion 14 between the step 21 and shoulder 19 acting as bearing surfaces against the lid opening during rotation.

In use, the container base 11, after de-nesting from other container bases, is charged with product, usually on a filling line, the product usually being in liquid form and including the ingredients which are subsequently to be blended. The blending element 14 is assembled with the lid 12 by inserting the blending element as a push fit through the opening in the lid 12. Prior to this operation the lids 12 are de-nested from one another.

The assembled lid and blending element is then located over the upper opening in the base 11 to seal in the product within the container. In order to ensure that the lid 12 is sealingly united with the base 11, plastics sheet may be located around the lid and upper end of the base and the sheet (not shown) is shrunk by heat shrinking onto the assembly to provide a hygienic seal. Alternatively, the upper end of the container may be sealed by other means.

The filled container 10 is then ready for transportation but may be frozen to be transported in a refrigerated container and to give longer life to the product during transportation and storage. Alternatively, the product in the container is maintained at ambient temperature and, due to the sealed environment of the container, the filled container has a suitable shelf life and does not need to be defrosted. After filling, sealing and packing, the filled containers may be stored and transported to a dispensing location.

Figure 3:
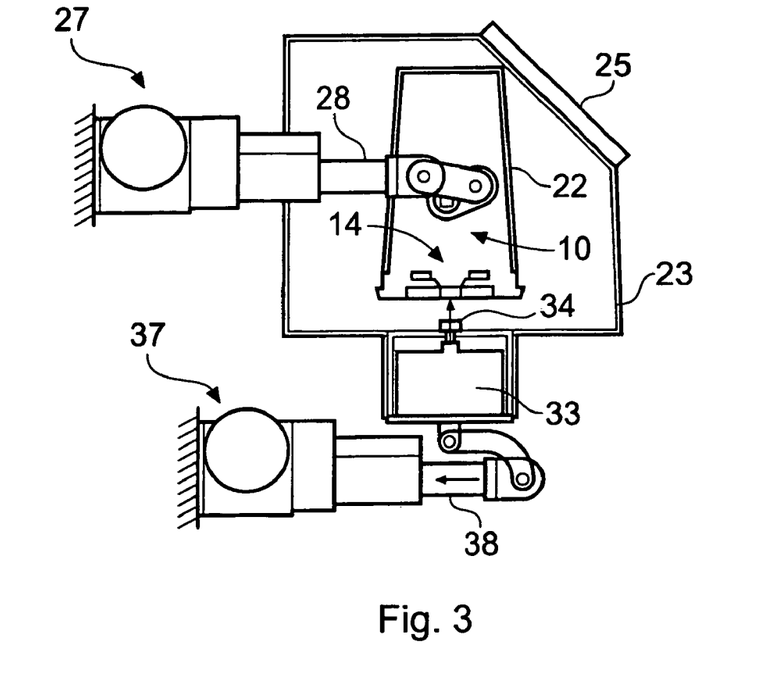
FIG. 3 is a view corresponding to FIGS. 1 and 2 in another position.
Figure 4:
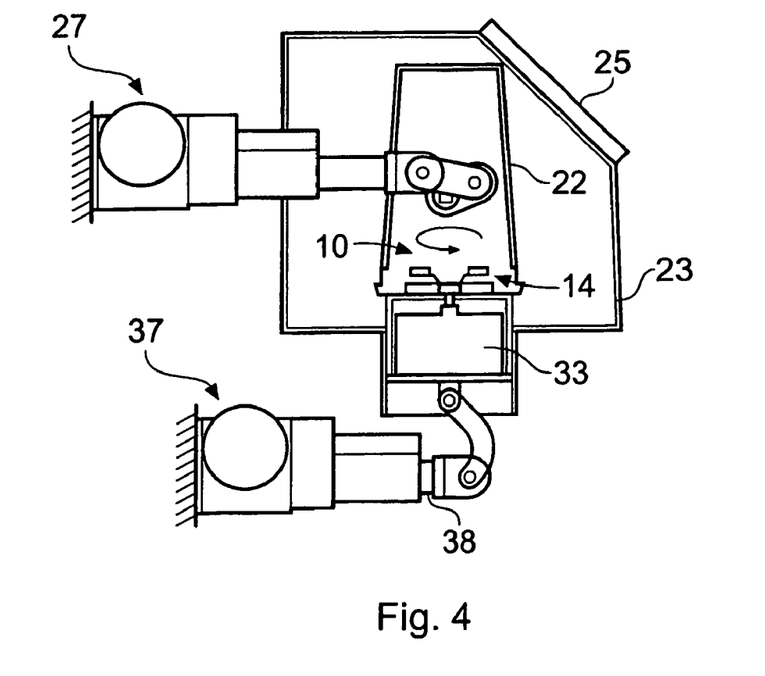
FIG. 4 is a view corresponding with FIGS. 1-3 in a further position.

At the dispensing location is situated apparatus as shown in FIGS. 1-4 by which the product within the container is blended ready for consumption. Referring to FIGS. 1-4 a filled container 10 is located in apparatus which includes a container holder 22, which is shaped according to the shape of the base 11 to receive the container. After location within the holder 22, the container 10 is clamped in position by clamping means (not shown) which clamps the upper end of the container and holds it in the holder 22. The holder 22 is, as shown, located in a position inclined to the vertical during location within a housing 23 having an opening 24 through which the container 10 is located, the opening 24 having a closure 25 moveable to admit the container 10 and closable over the opening 24 when the container is in position, and the upper end of the container being directed towards the opening. The clamping means not only holds the container in the holder but also the lid on the container during inversion and blending When in position and clamped, the holder 22 and the container 10 are rotated about a horizontal axis 26 by means of a drive arrangement 27 which may include a linear drive providing a reciprocal movement of a shaft 28 which through linkages 29 and 30, rotates the holder 22 through about 145° to an inverted position of the container, as shown in FIG. 3.

Figure 1:
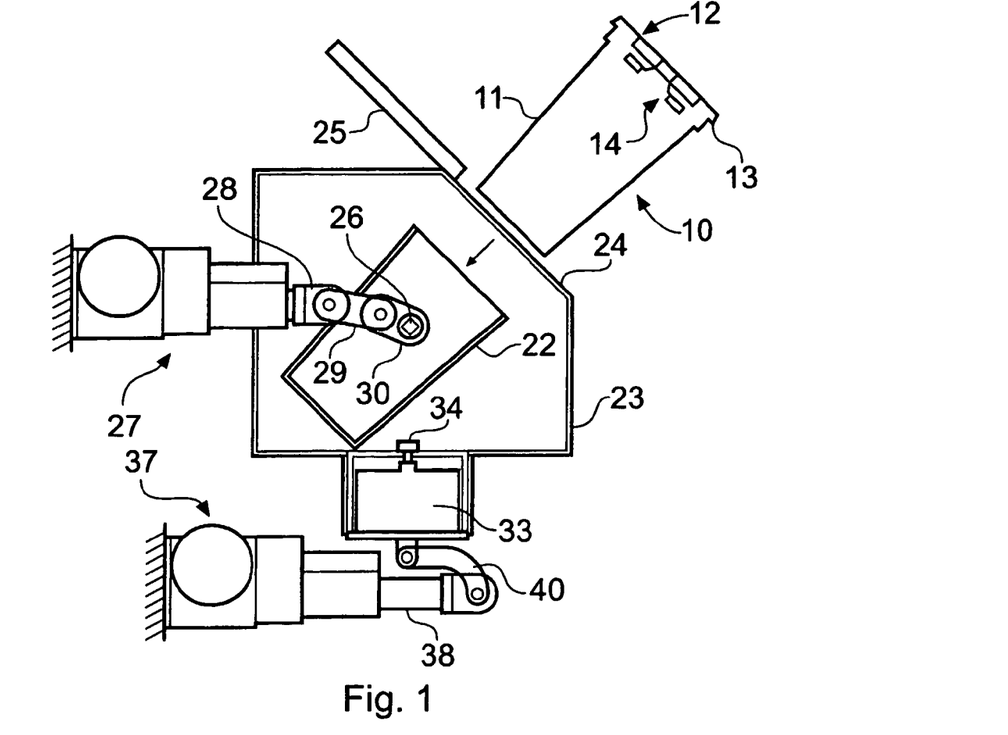
FIG. 1 is a diagrammatic vertical section through blending apparatus, in one position.
Figure 2:
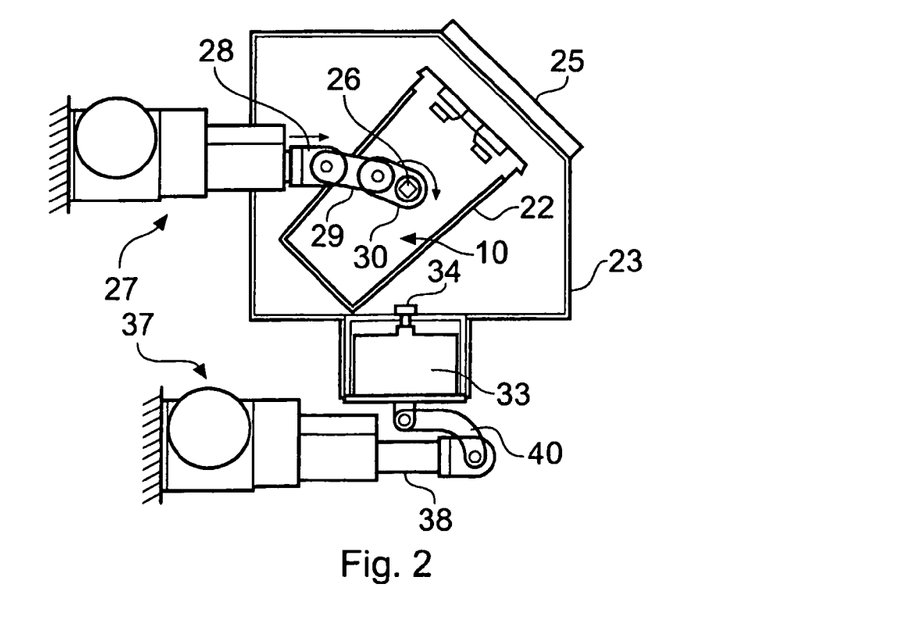
FIG. 2 is a view corresponding to FIG. 1 in another position.

Located in the base of the housing 23, is a drive motor 33 which rotates about an upright axis and has at its upper end a drive shaft 34 arranged to be drivingly connected to the blending element 14 of each container by engagement with the opening 20 in the blending element 14.

As the container and holder reach the inverted position, the drive shaft 34 is in a retracted position in the base of a housing 23 and the blending element 14 is spaced from said base, as shown in FIG. 3. The drive motor 33 and its associated shaft 34 is then elevated vertically so that the shaft 34 drivingly engages the blending element 14. This is achieved by a drive motor 37, which may be a linear drive, having a drive shaft 38 and a cranked link 40 reciprocally moveable so that upon outward movement the motor 33 is raised into the chamber defined by the housing 23 into driving engagement with the drive element 14. Upon operation of the drive motor 37, the blending element 14 is rotated to blend the contents of the container 10. A reverse operation of the motor 27, after disengagement of the drive 34, rotates the holder 23 back into its initial position so that the container 10 with its blended contents is removeable from the housing 23, ready for consumption. Consumption may be by removal of the lid 12 with its associated blending means 14 or by providing a portion of the lid 12 which is flangible and through which a straw may be admitted into the container. Alternatively, the lid may have an access arrangement by way of a flip open closure (not shown) by which a hinged portion of the lid is moved upwards to create an opening, which may be small (for straws) or large for drinking the product. As a further alternative, an opening may be sealed by an adhesive strip which is peeled off for opening.

The housing 23 permits the use of microwave radiation to heat the contents of the container 10 when it is in position within the housing 23. In this case, the housing 23 provides a microwave housing into which microwave energy may be imparted to heat the contents of the container 10 to the desired temperature for the blending operation. Microwave operation may be provided by any convenient means suited to the size and contents of the container 10 to provide the required amount of microwave energy to bring the contents up to the desired temperature. Suitable heating may be for a given duration assuming the temperature of the product admitted to the chamber 23 is known and the desired final temperature is also known. However, the temperature of the container upon admission may be detected so that this is taken into account in the duration of the heating process. If the contents of the container are not frozen but already at the desired consumption temperature, it may not be necessary to provide heating means within the housing 23, and the housing may be omitted.

As a further alternative the inversion arrangement provided by the motor 27 may be omitted and the user places the container 10 in an inverted position onto the drive for the blending element, with or without a housing 23 and with or without the heating arrangement described. If the container 10 is to be directly placed onto the drive 33, 34, a housing with microwave heating may still be provided so that heating takes place after the container is located in driving arrangement and after closing the housing. The container, lid and blending element components are selected for use within a microwave environment. The microwave heating components may be in a module mounted on the housing.

Figure 10:
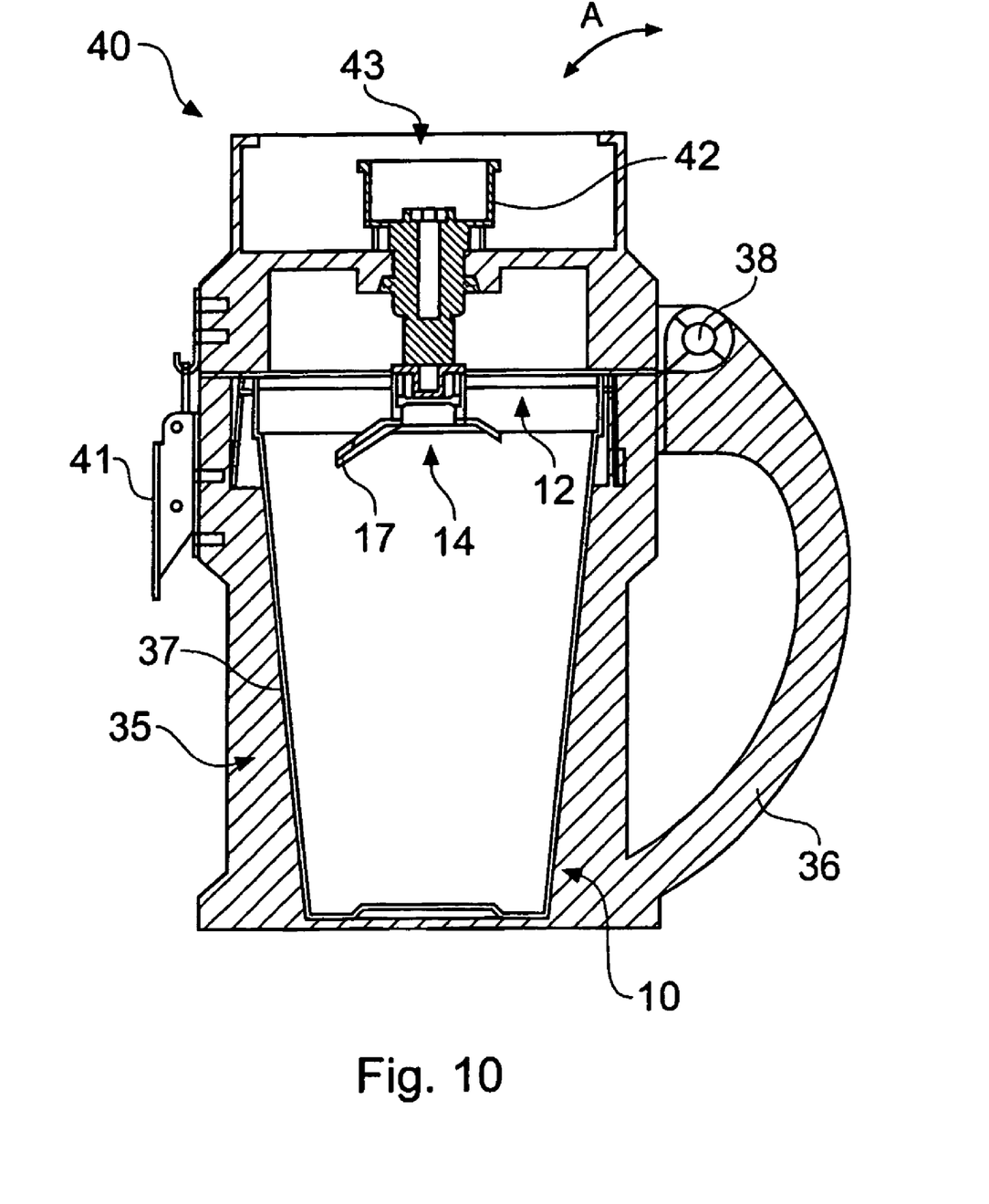
FIG. 10 is a cross-section through an adapter for locating the blending apparatus in engagement with a drive.

Referring now to FIG. 10, there is shown an arrangement by which an assembled container 10, lid 12 and blending element 14 may be located by an adapter for engagement with a drive arrangement which may take the form of a conventional blender base (not shown).

The adapter includes a jug unit 35 having a handle 36 and an internal space 37 shaped to receive a container 10 of the kind previously described, as the close fit therein.

Pivotally attached at pivot 38 to the jug 35 is a coupling member 40 which can pivot in a direction A about the pivot 38 between an open position in which the container 10 can be admitted to the space 37, and a closed position (as shown in FIG. 10) in which it can be located by a toggle clamp arrangement 41. The coupling member 40 includes a rotatable element 43 which is arranged to be drivingly coupled at one end to the blending element 14 in the container 10 and is drivingly connectable at the other end through connecting elements 42 to a conventional blending drive output.

Thus, when the container 10 with product therein and assembled with the lid 12 and blending element 14 has been located in the jug 35, the adapter member 40 is secured over the container by the toggle clamp 41 so that the assembly is secured together, whereupon the assembly is inverted to locate the coupling element 42 onto a blender base drive element (not shown) whereby to drivingly connect the blender 14 to the drive in the base for the blending operation.

This arrangement permits the assembly to be operated by a conventional blender base whilst retaining a container 10 and blending element 14 of simple one trip construction in an assembly which permits the use of simple and cheap materials for the container 10 and blender 14. The container and blender assembly is firmly held and clamped in the jug 35 by the adapter member 40 whilst permitting drive to be transmitted from the blender motor to the blending element 14 through the coupling 43. For different containers 10 of different sizes a different jug 35 may be provided with an opening 37 sized to receive the particular size of container 10.

Referring now to FIGS. 11-14, there is shown another apparatus by which the containers 10 of product having the lid 12 with integral blending element 14 can be heated and blended. Alternatively, the heating stage can be omitted in such apparatus and only a blending operation performed.

Figure 11:
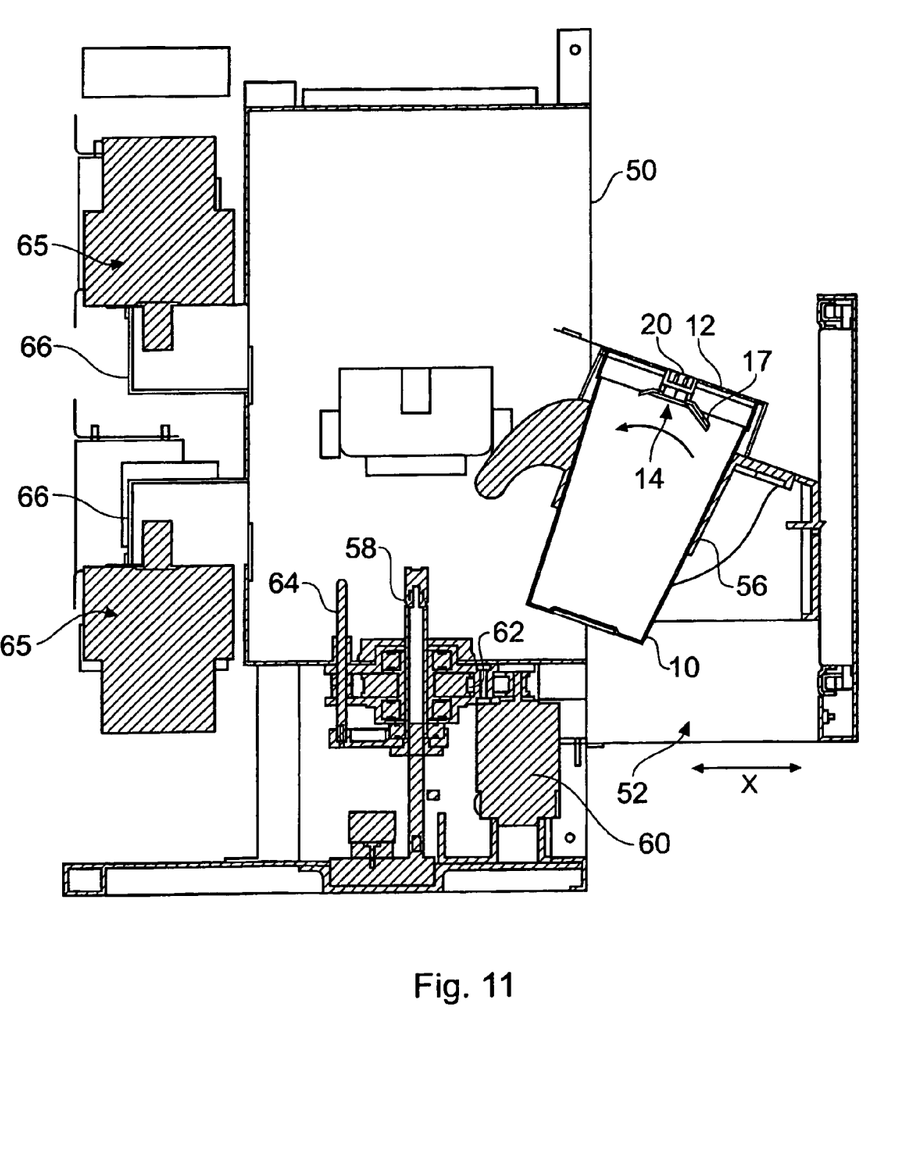
FIG. 11 is a vertical cross-section through an alternative assembly in which the container and integral blending means can be heated and blended.
Figure 12:
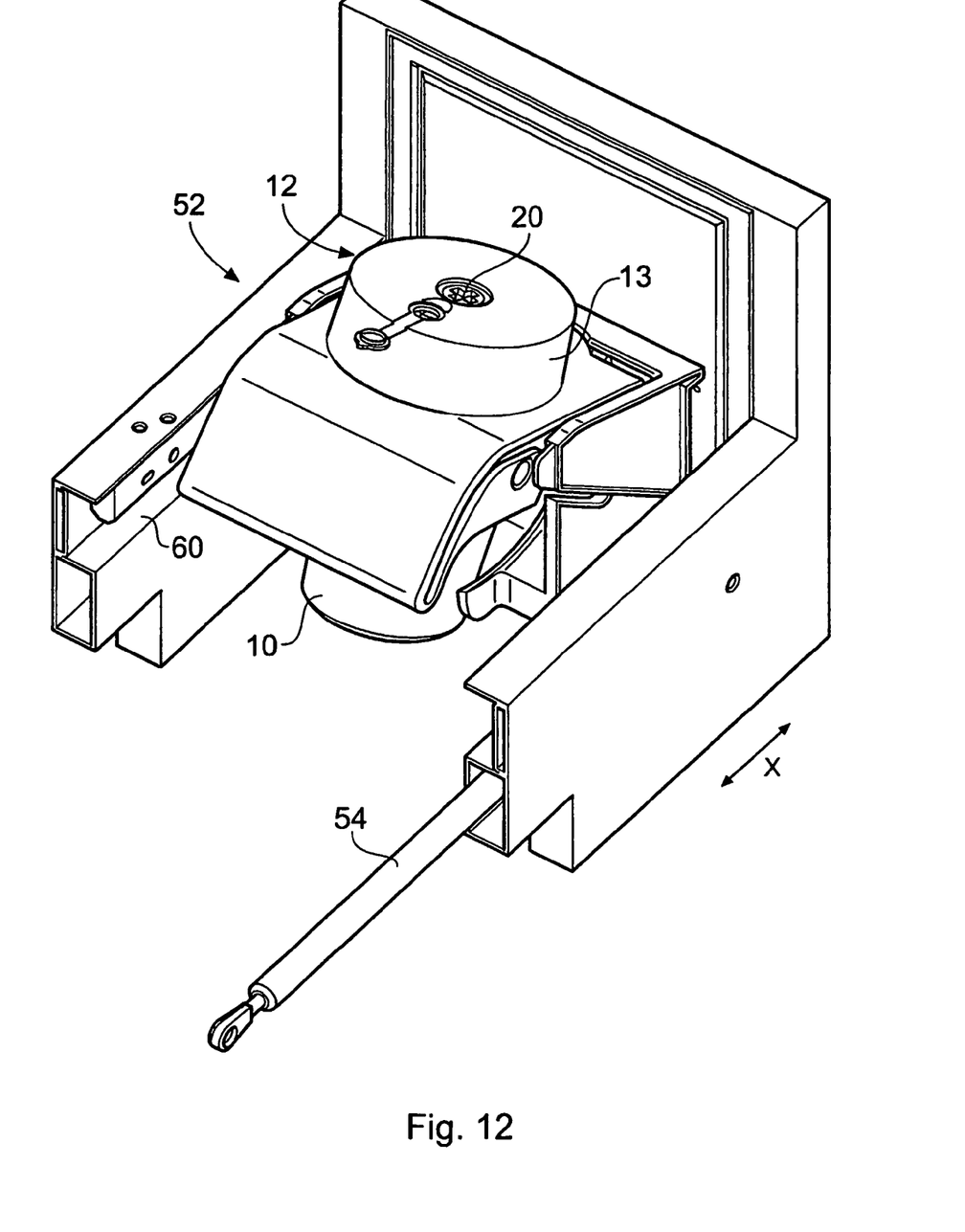
FIG. 12 is a perspective view of part of the assembly of FIG. 11.
Figure 13:
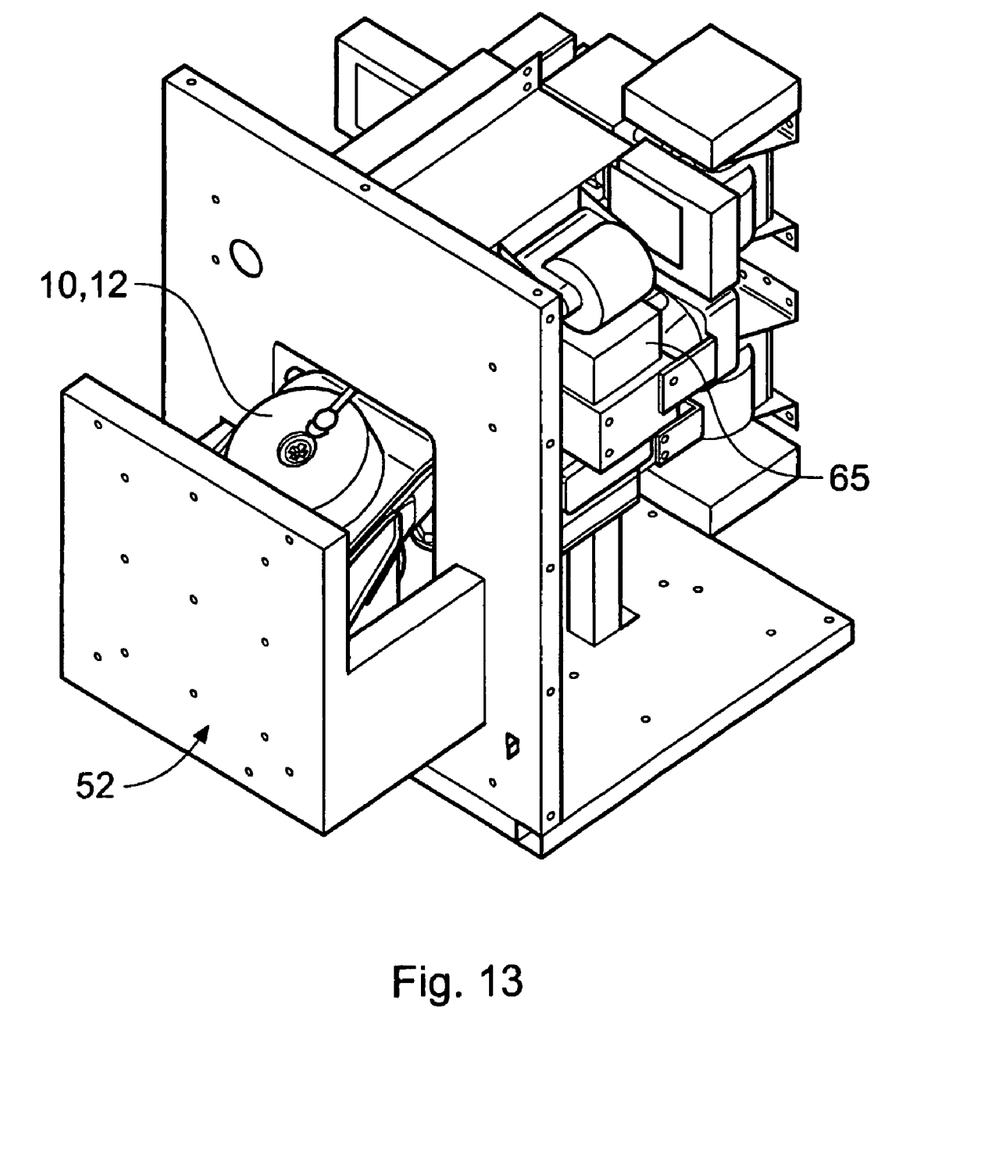
FIG. 13 is another perspective view of the assembly.
Figure 14A:
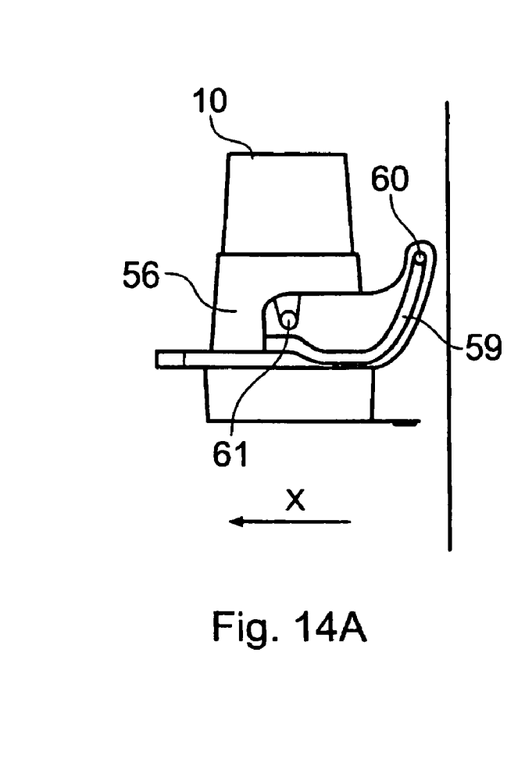
FIGS. 14A, 14B and 14C show schematically in side view an inversion arrangement.
Figure 14B:
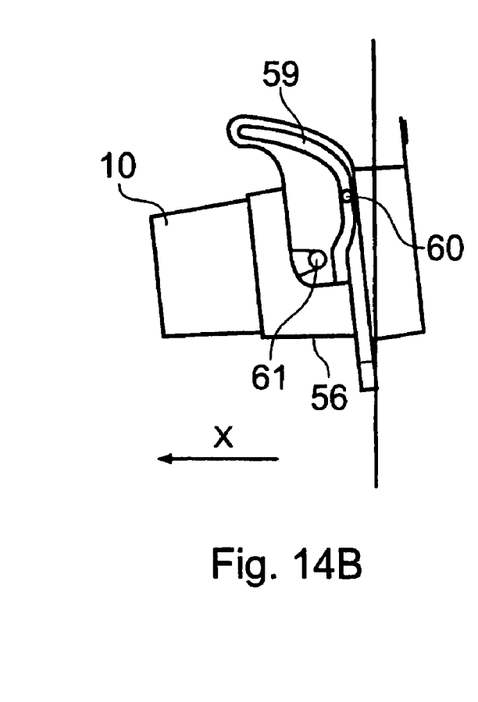
Figure 14C:
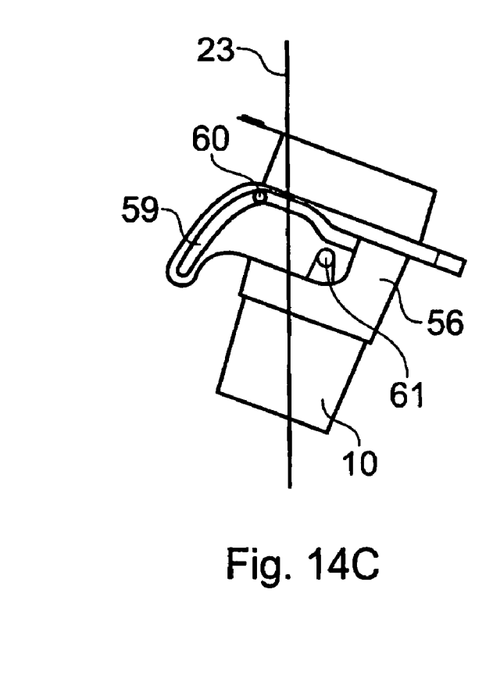

The apparatus provides a chamber 50 which acts as a heating chamber in which product within the container 10 is heated by microwave energy. The chamber 50 also provides the location for the container during a blending operation.

In order to admit containers into the casing 50, there is provided a moveable mounting in the form of a drawer arrangement 52 which is reciprocally moveable in the direction X manually, by a drive arrangement, or by a combination of manual and driven movement.

In the illustrated arrangement, the drawer 52 is manually moved inwards to an operative position but, upon completion of the blending operation, is released for movement to a removal position under the action of gas struts 54 located to each side of the drawer 52. During location towards the operative position the gas struts are compressed, expansion taking place once the drawer is released for movement towards the removal position by operation of a locking mechanism usually a magnetic catch.

When the drawer 52 is in the removal position, as shown in FIG. 11, assembled containers of product are locatable into a seating 56 shaped to engage the tapered side walls of the container 10, so that the container is firmly located within the seating 56 but is releasable therefrom. The seating 56 is formed as part of a pivotal mounting which is arranged to automatically move from the position shown in FIGS. 11, 12 and 13 in which the container is locatable in the seating 56, to an inverted position in which the lid 12 is lowermost and the drive connection for the blending means 14 is engaged with a drive shaft 58 which is directed upwardly into the casing 50.

Movement of the holder takes place as the drawer member 52 is moved in the direction X by inter-engagement of a cam 59 and cam follower 60, the cam 59 being part of the fixed structure and the follower 60 moving with the drawer 52. Thus as the drawer 52 is moved in the direction X the container and associated seating 56 rotate about pivot 61 through 180° or more degrees to invert the container 10. A detector (not shown) detects it is in position and cause the drive shaft 58 to engage with the opening 20 of the blending element 14 to be in driving connection therewith. The shaft 58 may move upwards to engage and, in so doing, lift the container into engagement with an upper abutment (not shown) to clamp the container.

Microwave generation means 65 is located around the casing 50 to direct microwave energy at different heights and positions in the casing 50 via wave guides 66 towards the container 10 within the casing. This causes product within the container to be heated up under the action of the microwave energy so that the product is at a suitable temperature for blending when the drive shaft is energised. Prior to blending, and during heating, the drive shaft 58 may be operated in a slow speed mode of, say, 60 rpm whereby to slowly move product within the container and ensure that the heating action is dispersed amongst the product. After heating, the drive shaft 58 is operated at high blending speed to cause blending of the product in the container which has reached an adequate temperature for blending action.

The shaft 58 is driven by a motor 60 through gearing 62 and the container is clamped by a clamp 64 during blending.

Figure 15A:
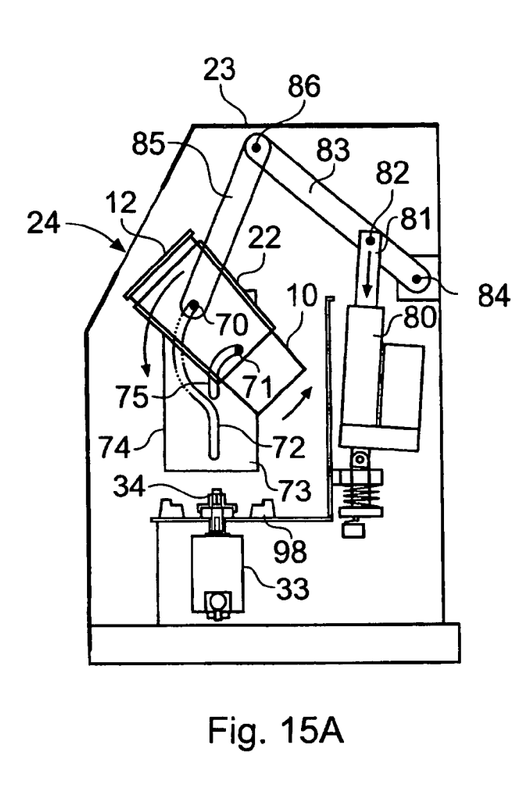
FIGS. 15A, 15B and 15C show an alternative inversion mechanism.
Figure 15B:
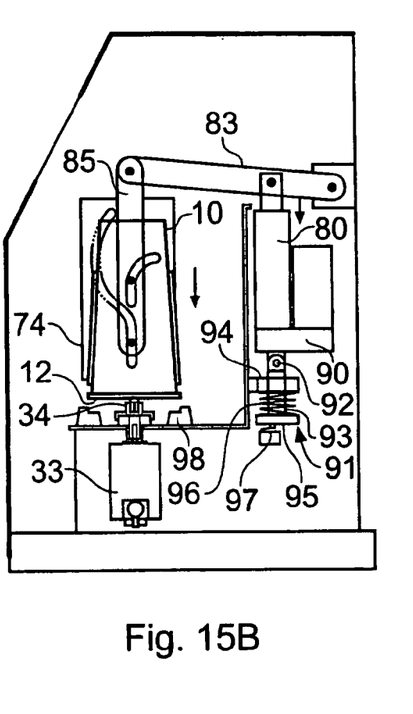
Figure 15C:
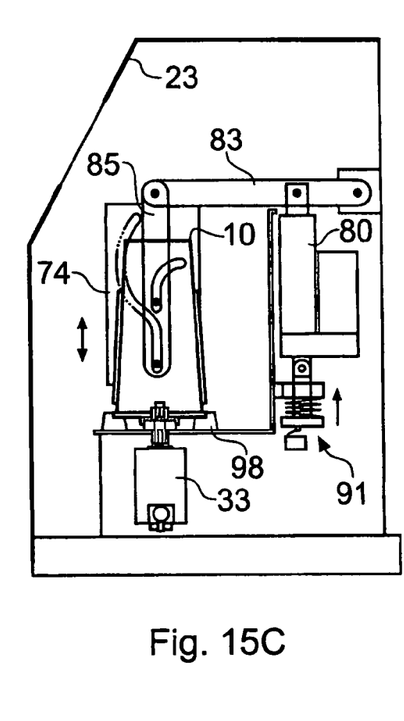

Referring now to FIGS. 15A, 15B and 15C, there is shown an alternative inversion arrangement for the container 10. In this arrangement there is provided a housing 23 and an opening 24 leading into the interior of the housing. Containers 10 are located in a tapered seating member 22 arranged to receive the tapered container 10 as a close fit therein. The seating member 22 has extending outwardly from the side positioned spaced along the axis of the member 22 pins 70 and 71, the pin 70 engaging in a cam track 72 formed in a guide box 74 rigidly mounted in the housing 33. The pin 71 is located in a cam track 75 also formed in the guide block 74. The pins 70 and 71 are arranged for movement along the respective cam tracks 72 and 75 during a pivoting action of the seating member 22, as will be described.

Inversion of the container 10 is achieved by a linear drive 80 from which extends a reciprocal drive member 81, pivotally attached at its outer end through pivot 82 to a lever arm 83. The lever arm is pivoted at one end to the frame 23 through pivot 84, at its other end the lever arm 83 is attached to a further lever arm 85 through a pivot 86. Thus, as the linear motor 80 is operated, the drive reciprocates the member 81 and causes the lever arms 83 and 85 to execute up and down motions. The lever arm 85 is attached at its free end to the pin 70.

As the linear drive 80 is operated the seating member 22 is moved from the position in FIG. 15A, which is a receiving position for receiving a container 10 through the opening 24, to an inverted position shown in FIG. 15B due to the arrangement of the cam tracks 72 and 75 along which the pins 70 and 71 travel during operation of the linear drive 80. Thus, as the linear drive contracts the arm 83 is drawn downwardly about the pivot 84, the arm 85 also moves downwards and the seating member 23 pivots through approximately 135 degrees and moves from an inclined upwardly directed position to a vertically downward direction.

In the inverted position, the container lies vertically along the axis of a drive motor 33 having a driving member 34, and further movement of the linear drive 80 causes the seating member 22 with its associated container 10 to move vertically downwards. This vertical movement causes the drive member 34 to engage the drive of the blending element located in the lid 12 of the container 10, as seen in FIG. 15C.

The linear drive 80 is mounted on a support 90 and the lower side of the support is pivotally attached to a resilient stop member 91 through a pivot 92. The shank 93 of the stop member 91 extends through a fixed apertured member 94 and there is located between the member 94 and an enlarged end 95 of the stop member 91 a spring 96 which is arranged to resiliently urge the stop member 91 in a downwards direction.

As the linear drive operates to cause the container to move downwards into drive engagement, any resistance encountered will cause the resilient spring 96 to be compressed and the enlarged end 94 of the stop member 91 will move upwards by compression of the spring 96. Such movement is detected by a proximity switch 97 which signals such movement to the control system to interrupt any further movement of the linear drive 80. This ensures that no undue pressure exceeded between the drive 34 and the container. The spring 96 is selected to give the required resilience and is preferably a belville spring washer which is arranged to move only when a predetermined compressive pressure is applied thereto. By setting the pre-determined compressive pressure it can be ensured that the force level which causes operation of the switch 97 is known and is at a level which detects excessive pressure.

FIG. 15C shows the container 10 and its associated blending element in the operative blending position at which the blender drive 33 is operated to transmit drive from the drive connector 34 to the blender within the container.

After blending, a reverse movement of the linear drive 80 causes the levers 83 and 85 to have their direction of movement reversed, initially drawing the container and associated seating member 22 upwards and then pivoting the seating member to return it through 135 degrees to the initial position shown in FIG. 15A. In this position, the container 10, now with blended product contained therein is removeable from the seating member 22 for consumption in the manner described.

It will be seen that the outer rim of the lid 12 reaches engagement with a circular support 98 as the container is lowered downwards towards the drive 34 whereby to secure the lid 12 on the container during blending. In FIGS. 15A, 15B and 15C, the housing 23 is shown without any microwave heating system but this may be included if desired. The illustrated arrangement shows a simple system for inverting the container for blending which incorporates a motor for inverting the container and a further motor for activating the blending operation.

Figure 16A:
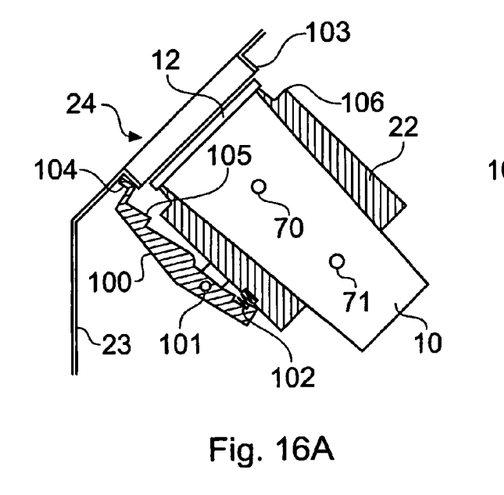
Figure 16B:
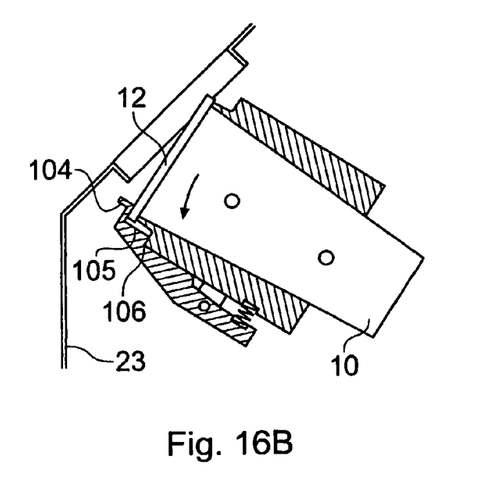
Figure 16C:
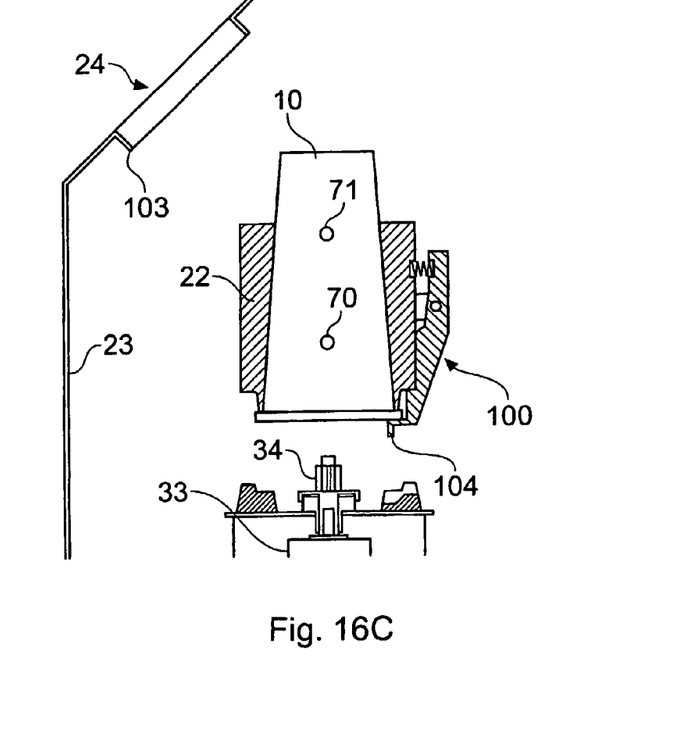

Referring now to FIGS. 16A, 16B and 16C, there is shown an arrangement which may be utilised in the preceding embodiment of FIG. 15, to ensure that the container body and the associated lid 12 are maintained in a secure sealed relationship during inversion of the container and blending of product within the container. The same reference numerals are to be used in FIGS. 15 and 16 for similar components. In FIG. 16 there is shown a positive means for locking the container within the seating member 22 during the inversion operation.

The seating member 22 carries at one side thereof a pivotal locking member or chip 100 which is mounted for pivoting about a pivot pin 101 relative to the member 22. Such pivoting movement is controlled by a spring 102 which urges the locking member towards a locking position, shown in FIGS. 16B and 16C. In FIG. 16A, the locking member 100 is pivoted away from a locking position about the pivot 101 thereby compressing the spring 102. For this purpose, the opening 24 into the housing 23 is formed with an inwardly directed, circular section shield 103 and the outer end of 104 of the locking arm 100 engages the outside of the shield 103 when the container is in position adjacent the opening 24. In this position, the container 10 may be inserted into or removed from the seating member 22.

The locking member 100 is profiled along its inner side to provide a shoulder 105 arranged to engage against a corresponding shoulder 106 formed on the support member. Thus as the support member 22 moves towards the inverted position, the free end 104 of the locking member 100 moves away from the shield 103 and is urged by the spring 102 about the pivot 101 into a position in which the shoulder 105 engages the shoulder 106 on the support member 22. Furthermore, the outer end 104 of the locking member 100 engages the upper side of the lid 12 of the container 10 thereby ensuring that the lid 12 remains on the container 10. This situation remains whilst the container is moved to a vertical position, FIG. 16C and is returned towards the upright position of FIG. 16A. Upon reaching the FIG. 16A position the member 100 is pivoted away from the locking position by engagement with the shield 103.

The arrangement provides ready means for dispensing from the containers whereby, after blending, the product may be consumed from the container, or the container emptied, and the container and the associated blending means is disposed of The container base may be of conventional beaker or mug construction of paper, cardboard, plastics or the like.

The container may be used to ship the product after sealing the top with a heat sealed diaphragm, the product being in sterile condition. In this case, the lid and associated blending element may not be added to the container until the container reaches a blending and consumption location. At that location the seal is removed and an assembled lid and blending element are applied. Containers with seals and lids with blending elements can be stored at the consumption location. The containers may be stored in a magazine in an upright condition so that the lower container is removable and the next container is presented for use. The lids may be stored in a magazine for removal when required and the lids may be applied with information, such as "sell by" date, as they are removed from the magazine.

Filled containers may have their seals removed in batches at the dispensing/blending location and the lids are then applied thereto and the assembled units stored ready for use in a refrigerator or freezer.

During the location of the containers in the holder ready for a blending operation, the containers may be shaken or vibrated and this assists the microwave heating process.

Instead of the powered arrangement described by which the container is inverted for a blending operation, the inversion action may be manually operated and include a clamping action to clamp the container in a holder with a spring return and release mechanism.

In heating the product within the container control means may be provided to ensure that the product is at the correct temperature for blending taking account of the product input temperature, the need to heat the product quickly, and different product within the container.

The invention claimed is:

1. Blending apparatus comprising a container having an opening through which product to be blended is introduced into the container, a lid to close the opening, a blending element mounted on the lid and directed downwards into the container when the lid is located thereon, a drive driveably engageable with the blending element to rotate the element and obtain a blending action on product in the container, and a mount on which an assembly of the container, lid and blending element is arranged to be located during blending,
   the container being movable between an upright receiving position and an operative position in which the assembly is inverted with the lid lowermost and the drive is connectable to the blending element, wherein:
   the mount includes a container holder into which the container is inserted and the container holder is rotatable between the receiving position and the operative position,
   the container holder is located within a housing with access into the housing through an opening,
   the drive is located in the base of the housing for connection to the blending element when in the inverted operative position, and
   the drive is moveable vertically into driving engagement with the blending element after the container reaches an operative blending position.

2. Apparatus according to claim 1 further comprising a clamp to hold the container in the holder during movement between the receiving and operative positions.

3. Apparatus according to claim 1 wherein the mount includes a tapered seating which holds the container in place during inversion and operation.

4. Apparatus according to claim 1 wherein the drive is arranged to rotate the blending element at different speeds including a blending speed and a lower mixing speed.

5. Blending apparatus comprising a container having an opening through which product to be blended is introduced into the container, a lid to close the opening, a blending element mounted on the lid and directed downwards into the container when the lid is located thereon, a drive driveably engageable with the blending element to rotate the element and obtain a blending action on product in the container, and a mount on which an assembly or the container, lid and blending element is arranged to be located during blending,
   the container being movable between an upright receiving position and an operative position in which the assembly is inverted with the lid lowermost and the drive is connectable to the blending element, wherein:
   the mount includes a container holder into which the container is inserted and the holder is rotatable between the receiving position and the operative position,
   the container holder is located within a housing with access into the housing through an opening, and
   the housing provides a microwave housing whereby product within the container may be heated by microwave radiation prior to, during and/or after a blending operation.

6. Blending apparatus comprising a container having an opening through which product to be blended is introduced into the container, a lid to close the opening, a blending element mounted on the lid and directed downwards into the container when the lid is located thereon, a drive driveably engageable with the blending element to rotate the element and obtain a blending action on product in the container, and a mount on which an assembly of container, the lid and blending element is arranged to be located during blending,
   the container being movable between an upright receiving position and an operative position in which the assembly is inverted with the lid lowermost and the drive is connectable to the blending element, wherein:
   the mount is carried on a reciprocal support and during reciprocal movement of the support the mount is rotated between the receiving and operating positions, and
   the mount is movable relative to a fixed member, and a cam and a cam track are arranged to cause the rotational movement of the mount during said reciprocal movement.

7. Blending apparatus comprising a container having an opening through which product to be blended is introduced into the container, a lid to close the opening, a blending element mounted on the lid and directed downwards into the container when the lid is located thereon, a drive driveably engageable with the blending element to rotate the element and obtain a blending action on product in the container, a mount on which an assembly of the container, lid and blending element is arranged to be located during blending,
   the container being moveable between an upright receiving position and an operative position in which the assembly is inverted with the lid lowermost and the drive is connectable to the blending element, wherein:
   the mount includes a container holder into which the container is inserted and the holder is rotatable between the receiving position and the operative position,
   the holder is located within a housing with access into the housing through an opening,
   the drive is located in the base of the housing for connection to the blending element when in the inverted operative position, and
   the housing includes a drive arrangement to rotate the holder to bring the container into said operative position.

* * * * *